INVENTORS
AKIO HIZUME
SHUJI OYAGI
SHIGEHO TANAKA by McGlew & Toren
ATTORNEYS.

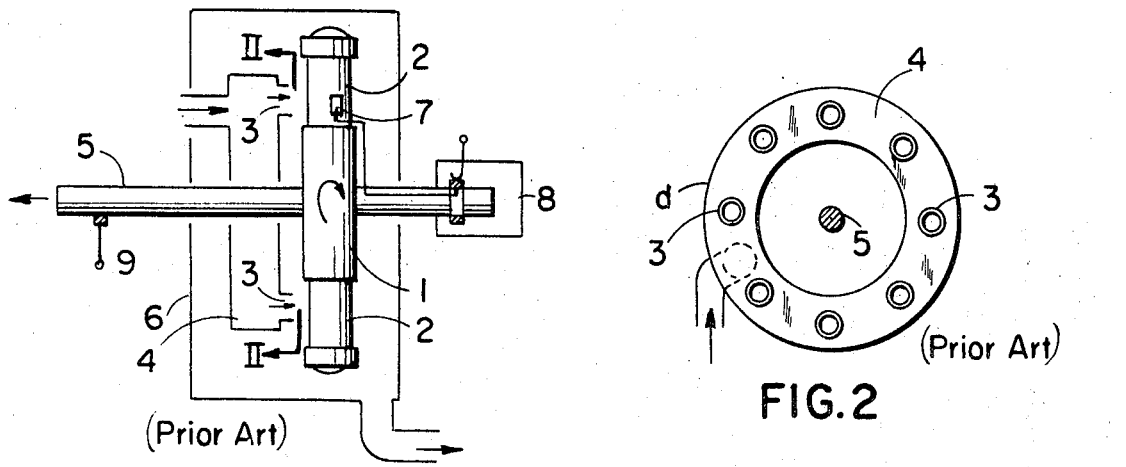
FIG. 1 (Prior Art)
FIG. 2 (Prior Art)
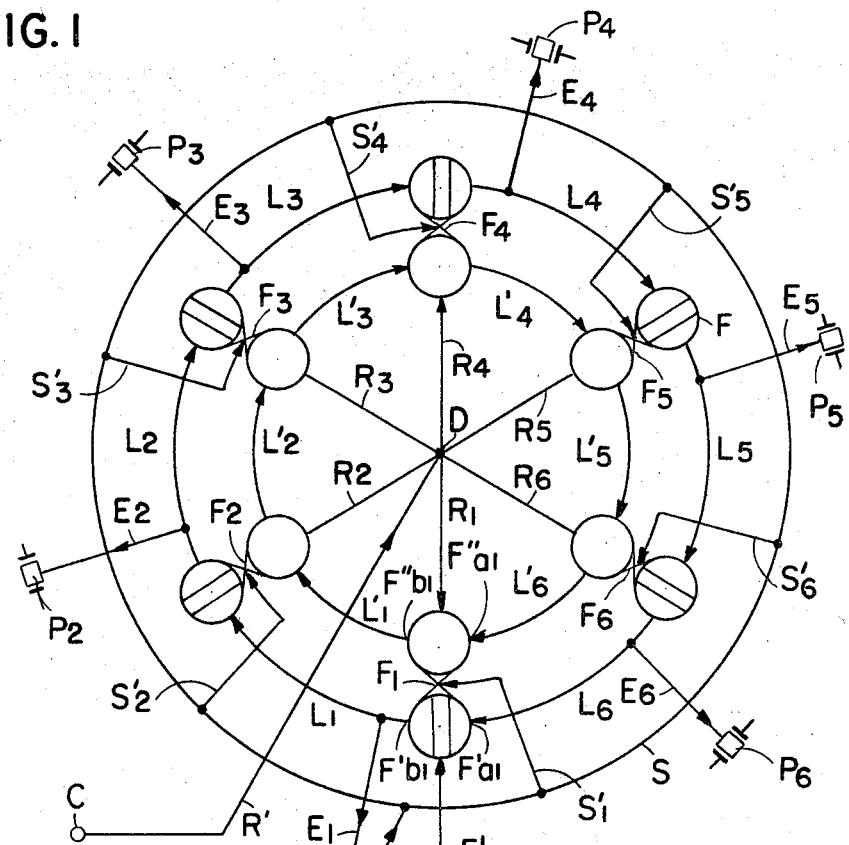
FIG. 3
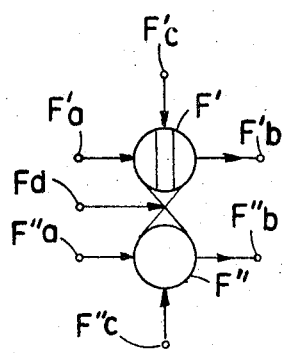
FIG. 4
INVENTORS
AKIO HIZUME
SHUJI OYAGI
SHIGEHO TANAKA
ATTORNEYS.

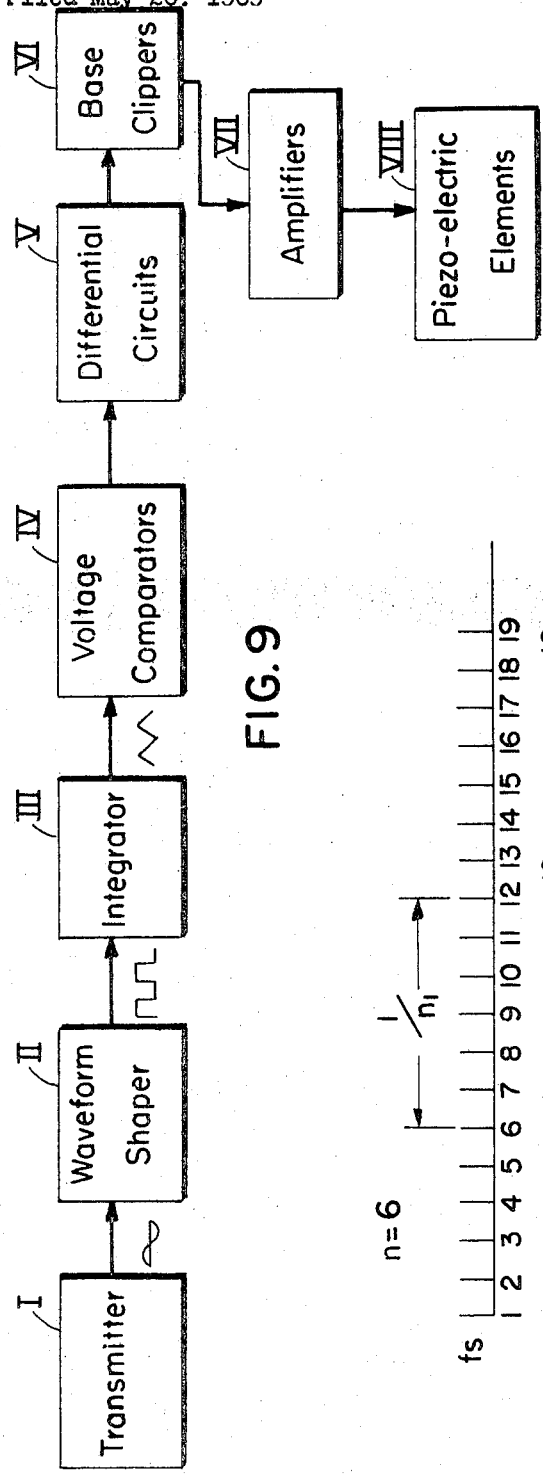
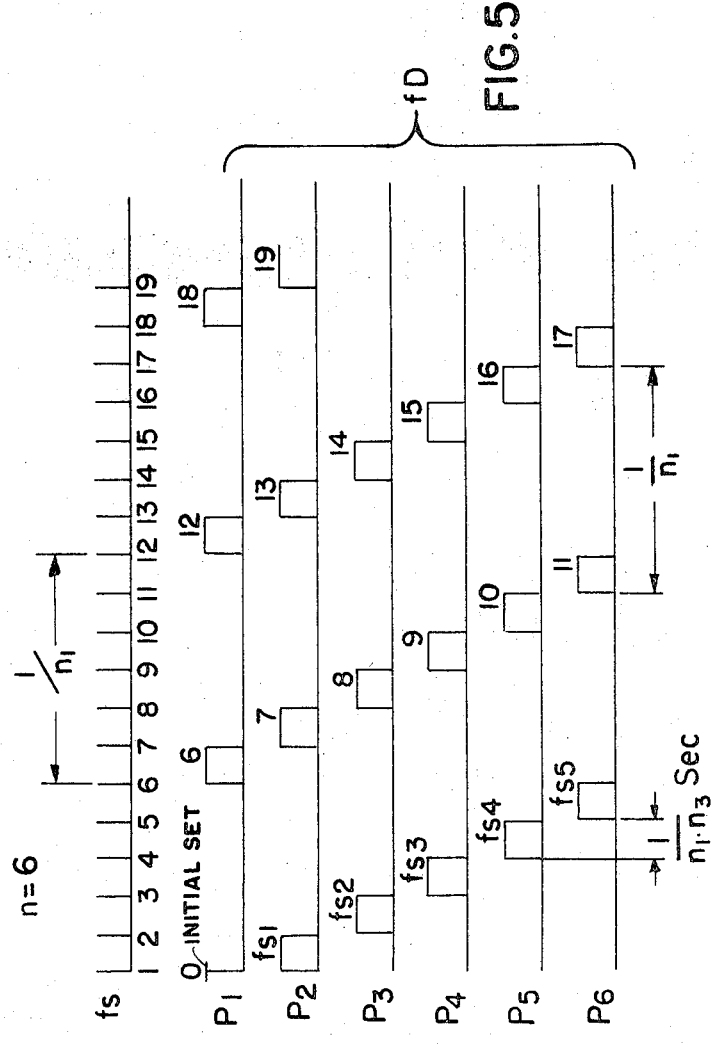
FIG. 9
FIG. 5

United States Patent Office 3,555,892
Patented Jan. 19, 1971

3,555,892
VIBRATION FORCE EXCITING METHOD AND APPARATUS
Akio Hizume, Shuji Oyagi, and Shigeho Tanaka, Nagasaki, Japan, assignors to Mitsubishi Jukogyo Kabushiki Kaisha, Tokyo, Japan
Filed May 26, 1969, Ser. No. 827,532
Int. Cl. B06b 1/06
U.S. Cl. 73—71.5                                   7 Claims

ABSTRACT OF THE DISCLOSURE

A method of simulating accurately the vibration modes of a rotary body, such as a vaned turbine rotor, having radially projecting elements subjected, during rotation of the body, to vibration from one or more vibration exciting sources comprises, while maintaining the rotary body stationary, applying sequentially and successively, to each projecting element, a vibration force having a frequency of $n_1 \cdot n_2$ wherein $n_1$ is the rated r.p.m., of the rotary body and $n_2$ is the number of vibration exciting forces effective on a projecting element during each revolution. The application of the vibration force is shifted from one element to the next succeeding element at phase difference of $1/n_1 \cdot n_3$ where $n_3$ is the number of projecting elements. The apparatus includes a number of flip-flop circuits equal to the number of projecting elements, and each associated with a respective piezo-electric element secured on a respective projecting member. The flip-flop circuits are triggered in sequence to apply the vibration forces to the elements sequentially and successively.

BACKGROUND OF THE INVENTION

In rotary fluid machines, such as steam turbines, gas turbines, etc., projecting members, such as moving vanes, are secured to the outer surface of a rotary body at equal angular intervals, and a definite number of vibration exciting sources, such as stator vanes or nozzles, are disposed adjacent the projecting members. The rotary body is driven by the energy of fluid jetted from the nozzles or between the stator vanes. The rotary vanes are subjected to the impact forces produced by the variation in velocity of the fluid each time a rotary vane passes a stator vane or nozzle during rotation of the rotary body.

Thus, a vibration force which may be expressed as the product $f_1 = n_1 \cdot n_2$, wherein $n_1$ is the r.p.m. of the rotary body and $n_2$ is the number of stator vanes, is applied to the rotor vanes. The elapsed time between the passage of two adjacent rotor vanes through the slip stream of a respective stator vane or nozzle may be expressed as $1/n_1 \cdot n_3$, which is the reciprocal of the product of the r.p.m. ($n_1$) of the rotary body and the number ($n_3$) of rotor vanes on the rotary body. Therefore, adjacent rotor vanes receive, in succession, the vibration force at a phase difference or, and equivalently, at the time interval $1/n_1 \cdot n_3$.

Groups of rotor vanes are elastically linked to each other by a retaining ring or the like, thus forming a finite cascade. This construction makes it difficult to analyze theoretically conditions in the rotor vanes, as contrasted to the case of a single vane or an infinite number of cascaded vanes, in which case the vibrating state can be easily analyzed mathematically. Under the circumstances, it has been necessary to measure the vibrating characteristics of the rotor vanes through experimental procedures.

In order to determine the vibrating characteristics of a rotor vane without actually rotating the rotary body, in a vibrating system, but by reproducing the vibrating state of the rotor vane, which is a projected member of the rotary body, an apparatus such as shown in FIGS. 1 and 2 has hitherto been used. Referring to these figures, in this conventional apparatus, there is a driving body 4 and, instead of steam nozzles, a number of water nozzles equal to the number of steam nozzles are arranged in driving body 4 at equal angular intervals from each other and opposite to rotor vanes 2 mounted on the outer part of a rotary disk 1. A turbine driving shaft 5, which is coupled with rotary disk 1, is rotatably mounted in a support, which has not been shown, and a housing is provided enclosing disk 1, vanes 2 and driving body 4 in a hermetically sealed manner. Pressure water is supplied to driving body 4 from a pump (not shown diagrammatically), and the water is jetted toward rotary vanes 2 from water nozzles 3 of body 4, whereby vanes 2 and disk 1 are rotated. At the same time, a periodic vibrating force is imparted to vanes 2, by the water jetted unevenly in a circumferential direction.

A strain gauge 7 is fastened to each rotor vane, and the lead wire of each strain gauge is connected to a slip ring 8 on drive shaft 5. Thereby the strain on vane 2 to which gauge 7 is fastened can be measured, and the r.p.m. of the driving shaft, which is the r.p.m. of rotor vanes 2, is measured by a revolution number detecting pick-up 9 mounted adjacent drive shaft 5. Thus, the vibrating characteristic of a rotor vane 2 can be determined.

In using vibration exciting apparatus of this type, it is necessary to provide a vibration testing rotor each time the projecting member, such as a rotor vane, of a rotary body is designed, and this involves a considerable amount of extra cost. In addition, apparatus of this type permits measuring only the portion of the vane to which the gauge is attached. When the projected element or vane is short, only one gauge can be attached to a respective projecting part. Thus, it is not possible to analyze the vibration states of various portions of the projected member at a single time, and the position of the strain gauge must be changed many times during an analysis.

Since it is impossible to increase indefinitely the number of slip ring terminals, the number of channels of a tape recorder used in the apparatus, etc., the vibrating phase relationship of all of the projecting members or rotor vanes cannot be determined simultaneously. It is for this reason that repetitive tests must be conducted.

In addition, the strain gauge 7 is in contact with the jetted water and is subjected to the centrifugal force due to rotation and, as a result, tends to be damaged.

A further disadvantage is that it is necessary to manufacture a new driving body 4 every time the ratio of the pitch of the exciting part, such as a stator nozzle, to the pitch of the projected part, such as a rotor vane, is altered. Thus, with conventional rotary-type vibration force exciting apparatus, a considerable amount of labor and time is required, it is difficult to analyze the test results, and the cost of the test becomes unacceptably high.

In addition, in a known static vibration exciting method in which a magnet, shaker, or the like is used to impart vibrations to the projecting members, such as rotor vanes on a rotor, it is impossible simultaneously to excite the projecting members at a vibrating phase difference corresponding to the slip stream of each nozzle. Thus, it is not possible to reproduce accurately the actual exciting state thereof.

SUMMARY OF THE INVENTION

This invention relates to the accurate determination of the vibrating characteristics of a rotary body, such as a vaned turbine rotor having radially projecting elements subjected, during rotation of the body, to vibrations from one or more vibration exciting sources and, more particularly, to a novel, improved and more efficient and accurate method and apparatus for effecting such determination.

In accordance with the invention, a vibration force, in terms of the product of the number $n_2$ of exciting sources and the rated r.p.m. $n_1$ is applied to a projecting member of a rotor, while the rotor is held stationary, and the vibration force is applied, in sequence, to successive projecting members at a phase difference which is the reciprocal of the product of the rated r.p.m. $n_1$ and the number $n_3$ of the projecting members or rotor vanes. The principal feature of the invention resides in the fact that a vibration force similar to that occurring in the actual rotating state of the rotor is imparted to the projecting members without rotating the rotary body, whereby the vibration characteristics of the projecting members, and especially the resonance characteristics with respect to the exciting sources, are accurately measured.

In accordance with the invention, because a vibration force in terms of the product of the number $n_2$ of exciting sources and the rated r.p.m. $n_1$ is applied to the projecting members of a rotor, it becomes possible that a vibration force, which is equal to that in the operating or rotating state of the rotors and which is applied to each of the projecting members when the rotor is rotated at the rated r.p.m. $n_1$ and passed in front of $n_2$ exciting sources, can be imparted to the projecting members. The vibration forces are applied to adjacent projecting members in sequence and at equal phase differences expressed as the reciprocal of the product of the rated r.p.m. $n_1$ and the number $n_3$ of projecting members. Accordingly, the vibration force can be applied sequentially to the projecting members at timed intervals equal to the actual timed intervals during operation of the rotor. These timed intervals represent the time interval between the passage of two successive projecting members in front of a respective exciting source imparting vibrations thereto. Thus, the actual exciting state can be reproduced without rotating the rotary body or rotor.

In accordance with the invention, and because a vibration force, which is the same as in the actual operating state, can be applied to a projecting member without rotating the rotary body, it is possible to observe directly the vibrating state of the projecting member and to analyze easily the vibrating mode in detail by applying pick-ups to necessary parts. Furthermore, since the invention method does not require a slip ring, the vibrating phase relationship of the projecting members as a whole can be easily checked in a short time. It is further possible to conduct the vibrating test on the actual machine without specially providing a test rotary body which makes it possible to greatly reduce the cost of testing. As it is not necessary to rotate the rotary body, the noise accompanying rotation of the rotary body can be eliminated and the gauge is protected from being damaged.

The apparatus of the invention comprises a number of flip-flop circuits equal to the number of projecting members whose vibration is to be measured. Piezo-electric elements are attached to each projecting member and each such element is connected to the set output terminals of a respective flip-flop circuit. A source of DC potential is connected to the direct set input terminals of a specific one of the flip-flop circuits, and a DC potential source is connected to all the direct reset input terminals of the flip-flop circuits. A transmitter is connected to all of the trigger signal input terminals of the flip-flop circuits.

The flip-flop circuits are linked with each other so that the set output terminal and the reset output terminal of a selected flip-flop circuit are connected to the set input terminal and the reset input terminal of the adjacent flip-flop circuit. By this arrangement, the set and reset output terminals of one flip-flop circuit are connected to the set and reset input terminals of its adjacent flip-flop circuit in succession in a manner such as to form a complete ring. The measuring procedures may be carried out by a minimum number of personnel.

An object of the invention is to provide an improved method of determining accurately the vibrating characteristics of a rotary body having radially projecting elements subjected, during rotation of the body, to vibration from at least one vibration exciting source.

Another object of the invention is to provide an improved apparatus for performing such method.

A further object of the invention is to provide such a method involving, while maintaining the rotary body stationary, sequentially and successively applying, to each projecting element, a vibration force having a frequency equal to the product of the rated r.p.m. of the rotary body and the number of vibration exciting forces effective on a projecting element during each revolution.

Another object of the invention is to provide such a method in which the vibration force is shifted from one projecting element to the next succeeding projecting element at a phase difference which is the reciprocal of the product of the rated r.p.m. of the rotary body and the number of projecting elements.

A further object of the invention is to provide an apparatus for performing such a method and including a number of flip-flop circuits, arranged in a ring configuration, and equal to the number of projecting elements, each flip-flop circuit being operatively associated with a respective piezo-electric element mounted on a respective projecting element of the rotor.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a somewhat diagrammatic axial sectional view of a conventional vibration force exciting apparatus;

FIG. 2 is a section taken on the line II—II of FIG. 1;

FIG. 3 is a schematic wiring diagram of vibration force exciting apparatus embodying the invention;

FIG. 4 is a schematic wiring diagram of a flip-flop circuit comprising an essential component of the apparatus shown in FIG. 3;

FIG. 5 is a pulse diagram of the pulses applied to the circuit illustrated in FIG. 3 and the output pulses from the circuit transmitted to the piezo-electric elements;

FIG. 9 is a block diagram illustrating another embodiment of the invention;

DESCRIPTION OF THE PREFERRED EMBODIMENTS

Figure 6:
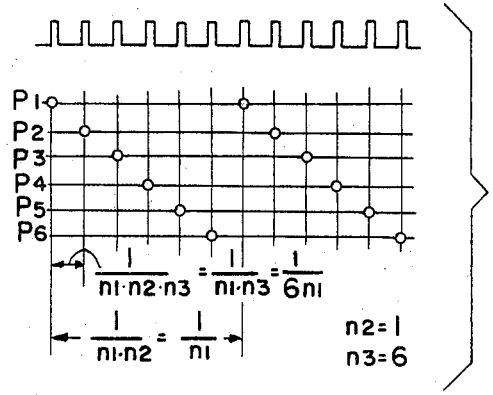
FIG. 6 is a diagram graphically illustrating the state in which an output pulse is transmitted to each piezo-electric element of FIG. 5.
Figure 7:
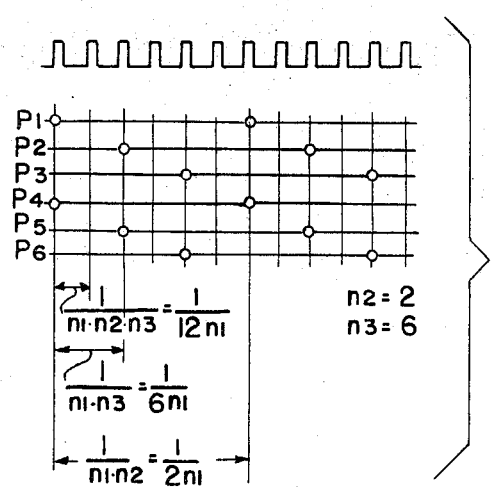
FIGS. 7 and 8 are diagrams, similar to FIG. 6, but illustrating the conditions with a different number of moving vanes and a different number of stator nozzles.

As stated, FIGS. 1 and 2 illustrate prior art vibration force exciting apparatus.

Referring to FIGS. 3 and 4, in the embodiment of the invention illustrated therein vibration forces are imparted to the rotor vanes of a turbine comprising six rotor vanes and one stator nozzle. The apparatus includes six flip-flop circuits F each comprising a part F′, which turns the flip-flop into the set state, and a part F″, which turns the flip-flop into the reset state. The set input terminal F′a of set part F′ is connected to the set output terminal F′b of set part F′ of the adjacent flip-flop by way of a lead wire L. The reset input terminal F″a of the reset part is connected to the reset output terminal F″b of the adjacent reset part F″ through a lead wire L′. Thus, the six flip-flop circuits F, whose number is equal to that of the rotor vanes of the turbine, are linked with each other in a ring form as illustrated in FIG. 3.

A direct set input terminal F′c is included in only the first flip-flop circuit F1, and the direct reset input terminals F″c in the reset parts F″ of flip-flop circuits F are connected to a single terminal D by leads or conductors R. A conductor R′ connects terminal D to a reset input terminal C.

When an initial setting single pulse is applied to direct set input terminal F′c, the flip-flop circuit cannot be operated accurately if more than two pulses are applied thereto simultaneously. To avoid this, it is necessary to provide a chattering preventative arrangement. A trigger input terminal Fd is included in each flip-flop circuit F, and terminals Fd are interconnected to a ring-shaped conductor S by conductors S′. Ring conductor S is connected to a shaft pulse transmitter, which has not been illustrated in the schematic wiring diagram of FIG. 5, but which transmits pulses to a terminal S″ connected to ring conductor S. Ring conductor L which is connected to the set parts F′ of flip-flop circuits F is connected to each of six piezo-electric elements P through conductors E. These piezo-electric elements, which may comprise titanic acid barium, etc., are mounted on the respective rotor vanes, which have not been shown in order to clarify the schematic wiring diagram of FIG. 2.

When a set level control input pulse is applied to set input terminal F′a of the set part of a flip-flop circuit F, the flip-flop circuit is set, and the pulses sent to the respective piezo-electric element P from set output terminal F′b through lead L, and thereby a vibration force is applied to the respective rotor vane. When a reset level control input is applied to reset input terminal F″a of reset part F″, the flip-flop circuit F is reset. In this case, no vibration force is applied to the respective rotor vane since the reset output terminal F″b is not connected to the respective piezo-electric element P.

When a trigger input is applied to trigger input terminal Fd, circuit F is set, if the set level control input is present in the flip-flop circuit F, that is, if a voltage is applied thereto. Circuit F is reset if the reset level control input is present therein. The arrangement is so designed that a set level control input and a reset level control input are not applied simultaneously to the same flip-flop circuit F.

In the arrangement shown in FIGS. 3 and 4, when reset input terminal C is closed, a reset pulse reaches all the flip-flop circuits F1, F2 . . . F6, and thus all the flip-flop circuits F are held in the reset state. Thus, a voltage is applied to the conductors L1, L2 . . . L6 which connect reset parts F″ to each other, and no voltage is applied to any of the lead wires L′1, L′2 . . . L′6 which connect the set parts F′ to each other.

When a single pulse, for initial set, is applied to direct set input terminal F′c of the first flip-flop circuit F1, only circuit F1 is changed from the reset state into the set state, while the other flip-flop circuits F2 . . . F6 are held in the reset state. Consequently, conductor L′1 interconnecting circuits F1 and F2 becomes non-conducting, and the other connecting conductor L1, between circuits F1 and F2, becomes conducting. As a result, a pulse is transmitted to piezo-electric element P1 connected to conductor L1 through conductor E1, so that the associated rotor vane on which piezo-electric element P1 is mounted receives a vibration force. On the other hand, circuits F2, F3 . . . F6 are maintained in the reset state and thus no pulse is applied to the other piezo-electric elements P2 . . . P6.

When the first shift pulse fs1 (FIG. 5) is transmitted to shift pulse terminal S″ from the shift pulse transmitter, a trigger input is applied to all the flip-flop circuits F through ring conductor S and conductors S′1, S′2 . . . S′6 which are connected to terminal S″.

At this instant, flip-flop circuit F1 is in the set state. However, as conductor F′6 is conducting and thus the reset level control input is applied thereto, the first flip-flop circuit F1 is changed to the reset state. Also, the second circuit F2 is in the reset state. However, since conductor L1 is conductive, and the set level control input is applied, circuit F2 is thus reversed into the set state. Circuits F3 . . . F6 are in the reset state and, since conductors L′2 . . . L′5 are conductive, these circuits are held in the reset state.

Thus, only circuit F2 is reversed into the set state by the first shift pulse fs1, whereby only the second piezo-electric element P2 is activated and thus only the second rotor vane is excited. After this operation, when the second shift pulse fs2 is applied to shift pulse terminal S″, only the third flip-flop circuit F3 is reversed into the set state and all the other flip-flop circuits F1, F2, F4, F5 and F6 are reset and thus a vibrating force is applied only to the third rotor vane.

In the same manner, the fourth, fifth, and successive circuit F4, F5 . . . are set sequentially with successive arrival of the shift pulses fs3, fs4 at the terminal S″, so that a vibration force is applied, in succession, to the fourth, fifth, and successive rotor vanes.

To realize the foregoing operation, it is necessary that the frequency $f's$ of the shift pulses $fs$ applied to shift pulse terminal S″ is made equal to the product of the rated r.p.m. $n_1$ of the rotor carrying the rotor vanes and the number $n_2$ of stator vanes or nozzles and the number $n_3$ of rotor vanes ($f's = n_1 \times n_2 \times n_3$). Thus, the number of flip-flops is made equal to the number of rotor vanes.

FIG. 3 and 4 illustrate the case where the number $n_2$ of stator nozzles is 1, and the number $n_3$ of rotor vanes is 6. FIG. 5 illustrates the relationship between the shift pulses $fs$ and the distribution pulses $f_D$ applied to the first through sixth piezo-electric elements P1 through P6.

Referring to FIG. 5, when a single pulse, for an initial setting, is applied, the pulse is sent to the first piezo-electric element P1, whereby the first rotor vane is excited. Then, by applying the first shift pulse fs1 thereto, the second piezo-electric element P2 is actuated. In the same way, the third, fourth, fifth and sixth piezo-electric elements P3–P6 are actuated sequentially responsive to each transmission of a shift pulse fs. Following this cycle, when the sixth shift pulse fs6 is transmitted, the first piezo-electric element P1 is again excited.

Each rotor vane has a vibration imparted thereto at a period of $1/n_1 \cdot n_2 = 1/n_1$ (as $n_2 = 1$). The vibration force is shifted to the sequentially and adjacent rotary vanes with a phase difference $1/n_1 \cdot n_3$. Thus, by varying the frequency $f's$ of the shift pulses $fs$, it is possible to reproduce the state in which the rated r.p.m. $n_1 = fs/n_2 \cdot n_3$ of the rotor is varied.

Furthermore, it is possible to vary the number of rotor vanes by varying the number of flip-flops F. Thus, while FIGS. 3 and 4 illustrate the arrangement involving six flip-flop circuits F to reproduce the state in which vibration is imparted in a turbine comprising six rotor vanes ($n_3 = 6$) and one stator nozzle ($n_2 = 1$), it is possible to reproduce the state in which a turbine comprising six rotary vanes ($n_3 = 6$) and two nozzles ($n_2 = 2$) is excited. For this, the set output terminal F′b1 of the set part of the first flip-flop circuit F1 is connected in parallel to the first piezo-electric element P1, mounted on the first rotor vane, and the fourth piezo-electric element P4 mounted on the fourth vane, the set output terminal F′b3 of the third flip-flop circuit F3 is connected in parallel to the second and fifth piezo-electric elements P2 and P5, and the set output terminal F′b5 of the fifth flip-flop circuit F′ is connected in parallel to the third and sixth piezo-electric elements P3 and P6.

By arranging the connections in this manner, each piezo-electric element P receives a pulse at an interval corresponding to $1/n_1 \cdot n_2 = 1/2n_1$ and thus each rotor vane receives a vibration at an interval corresponding to $1/n_1 \cdot n_2 = 1/2n_1$. The vibration force is applied to adjacent rotor vanes in succession at a phase difference corresponding to $1/n_1 \cdot n_3 = 1/6n_1$, which is the product of the period of shift pulse $1/n_1 \cdot n_2 \cdot n_3$ and the number $n_2$ of stator nozzles.

Those flip-flop circuits F2, F4 and F6, whose set output terminals F'b are not connected to piezo-electric elements P are used for the purpose of frequency adjustment and phase lag adjustment.

In the case of the turbine in which the number $n_3$ of rotor vanes is 21 and the number $n_2$ of stator nozzles is 27, 21 flip-flop circuits are connected in a ring form. The flip-flop circuits are divided into seven groups, each of which comprises three flip-flops F. (3 is the greatest common divisor of the number ($n_3$=21) of rotor vanes and the number ($n_2$=27) of stator nozzles). The first piezo-electric element P1 is connected to the set output terminal F'b1 of the first flip-flop circuit F1 of the first flip-flop circuit group. The second piezo-electric element P2 is connected to the set output terminal F'b7 of the seventh flip-flop circuit F7. In the flip-flop circuit network, this corresponds to the 27th nozzle counted in order from the first flip-flop circuit F1 to the second, third, etc., flip-flop circuits F2, F3, etc. It should be noted that, since the flip-flop circuit network is in a ring form comprising twenty-one circuits, the twenty first circuit corresponds to the first flip-flop circuit F1.

Figure 8:
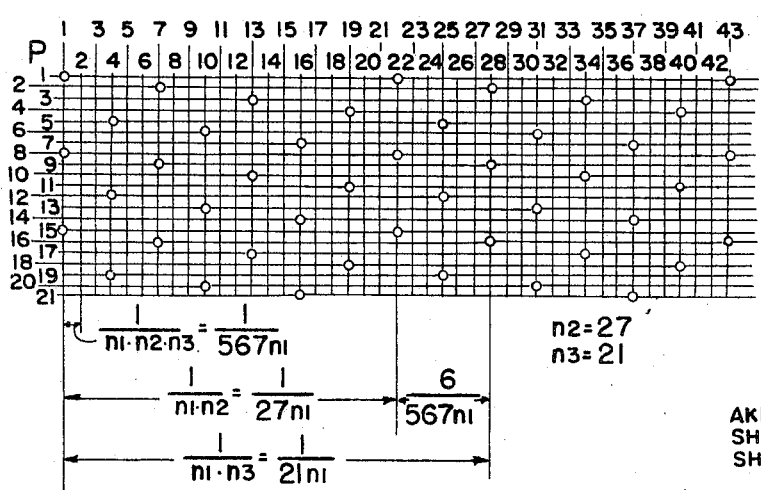

In the same manner, the third piezo-electric element P3 is connected to the set output terminal F'b13 of the 13th flip-flop circuit, and the fourth piezo-electric element P4 is connected to the set output terminal F'b19 of the 19th flip-flop circuit. The arrangement is graphically illustrated in FIG. 8.

With this arrangement, the first piezo-electric element P1 and the 8th piezo-electric element P8, which is the seventh piezo-electric element counted from the first piezo-electric element, and the 15th piezo-electric element P15, which is the 7th element counted from the 8th piezo-electric element, are connected in parallel to the output terminal F'b1 of the first flip-flop circuit of the first flip-flop circuit group. Namely, "seven" is the quotient derived by dividing the number ($n_2$=21) of rotor vanes by the greatest common divisor of the number ($n_3$=21) of rotor vanes and the number ($n_2$=27) of stator nozzles.

The connections are tabulated in the following table:

TABLE I

| Flip-flop group No. | Flip-flop circuit No. | Piezo-electric element No. | Flip-flop group No. | Flip-flop circuit No. | Piezo-electric element No. |
| --- | --- | --- | --- | --- | --- |
| 1 | 1 | 1, 8, 15 | 5 | 13 | 3, 10, 17 |
|   | 2 |          |   | 14 |          |
|   | 3 |          |   | 15 |          |
| 2 | 4 | 5, 12, 19 | 6 | 16 | 7, 14, 21 |
|   | 5 |          |   | 17 |          |
|   | 6 |          |   | 18 |          |
| 3 | 7 | 2, 9, 16 | 7 | 19 | 4, 11, 18 |
|   | 8 |          |   | 20 |          |
|   | 9 |          |   | 21 |          |
| 4 | 10 | 6, 13, 20 |   |   |          |
|   | 11 |          |   |   |          |
|   | 12 |          |   |   |          |

When the flip-flop circuits F and the piezo-electric elemetns P are connected as above, and a shift pulse, whose frequency is $n_1 \cdot n_2 \cdot n_3 = 567n_1$, is transmitted to the circuit, the twenty-one rotor vanes are vibrated at an interval of $1/n_1 \cdot n_2 = 1/27n_1$. Adjacent rotor vanes are vibrated successfully at a phase difference of $1/n_1 \cdot n_3 = 1/21n_1$, namely, $1/21n_1 - 1/27n_1 = 6/567n_1$. Because the number ($n_2$=27) of nozzles is greater than the number ($n_1$=21) of rotor vanes, the rotor vane adjacent to a rotor vane which has just been vibrated by a respective nozzle is vibrated by the nozzle adjacent such respective nozzle before being vibrated by the respective nozzle. Therefore, the apparent phase difference is $1/n_1 \cdot n_3 - 1/n_1 \cdot n_2 = n_2 - n_1/n_1 \cdot n_2 \cdot n_3$.

Referring to FIG. 9, which illustrates an alternative embodiment of the invention, a transmitter I transmits a sine wave whose frequency is $2f_1$ corresponding to twice the freequency $f_1 = n_1 \cdot n_2$ of the vibration force imparted periodically to a rotor vane (not shown in FIG. 9). The output terminal of transmitter I is connected to the input terminal of a wave form shaper II, and comprising a Schmitt trigger circuit, a differential circuit and a flip-flop circuit. Wave form shaper II converts the sine wave into a symmetrical square wave form whose frequency is $f_1$.

The input terminal of an integrator III is connected to the output terminal of wave form shaper II, and integrates the symmetrical square wave, whose frequency is $f_1$, and converts it into a symmetrical triangular wave form. The output terminal of integrator III is connected, in parallel, to voltage comparators IV whose quantity is $n_3/2$ (when $n_3$ is an even number), which is half the number of rotor vanes $n_3$, or $n_3 - \frac{1}{2}$ (when $n_3$ is an odd number). The output terminal of each voltage comparator IV is connected to a respective differential circuit V. Two base clippers VI are connected to each differential circuit V, whereby the positive and negative pulses of the differential circuit are separated from each other. Base clippers VI are connected with piezo-electric elements VIII to amplifiers VII, and the piezo-electric elements are secured to the rotor vanes.

In the embodiment of the invention shown in FIG. 9, it is assumed that the number $n_2$ of stator nozzles is 1, and the number $n_3$ of rotor vanes is 10. A sine wave at the frequency $2f_1$, transmitted from transmitter I, is shaped into a symmetrical square wave form whose frequency is $f_1$, and this square wave form is converted into a symmetrical triangular wave form by the integrator III.

Figure 10:
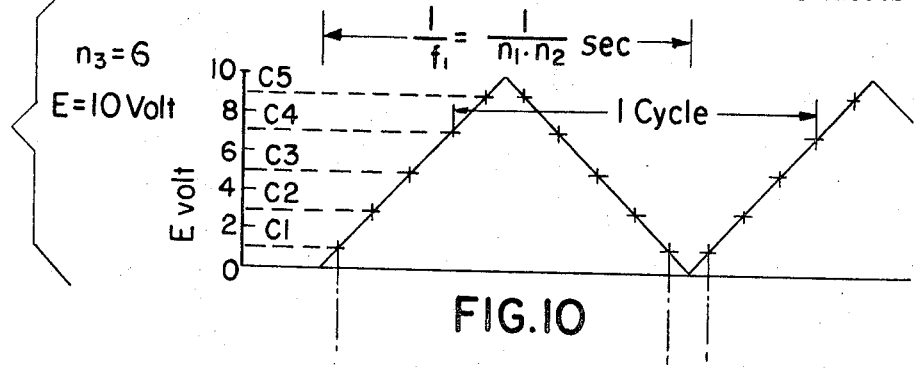
FIG. 10 is a graphic illustration of the splitting of a symmetrical triangular wave form, transmitted from an integrator, by five voltage comparators.
Figure 11:
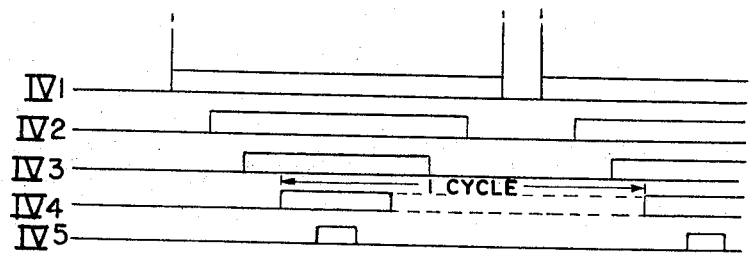
FIG. 11 is a graphic illustration of the output signals of the comparators.

Referring to FIG. 10, this symmetrical triangular wave form is set so that its amplitude is held at 5 v. Five voltage comparators IV1, IV2, IV3, IV4 and IV5 are held, respectively, at 1V, 3V, 5V, 7V and 9V. Accordingly, when the voltage of the symmetrical triangular wave increases gradually from its minimum value to its maximum value, the five comparators are activated in sequence at their respective voltage levels. When the symmetrical triangular wave decreases in voltage from its maximum value of 10 v., the five voltage comparators, starting with comparator IV5, are deactivated sequentially in accordance with their respective voltages. Thus, the five voltage comparators transmit their outputs in the manner shown in FIG. 11.

Figure 12:
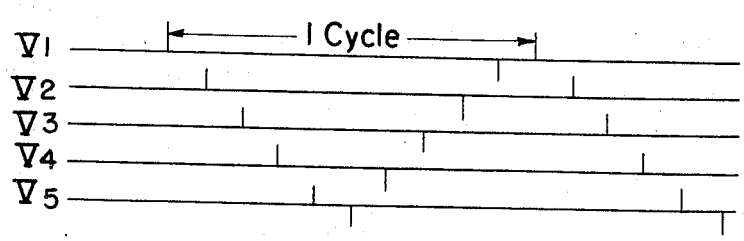
FIGS. 12 and 13 are, respectively, graphic illustrations of the output signals of a differential circuit and of a base clipper.
Figure 13:
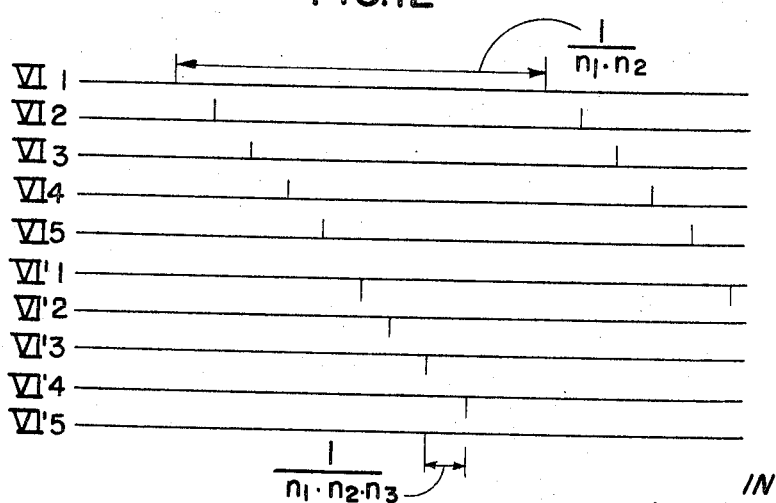

The differential circuits V1, V2, V3, V4, and V5 connected, respectively, to the voltage comparators, transmit positive or negative pulses, as shown in FIG. 12, when the associated voltage comparator either delivers an output signal or terminates an output signal. As a result, the ten base clippers VI1, VI'1 . . . VI5 and VI'5, there being two base clippers connected in parallel to each differential circuit, behave in such a manner that the base clippers transmit, in sequence, one each of five positive pulses and one each of five negative pulses at each phase lag $1/n_1 \cdot n_2 \cdot n_3 = 1/n_1 \cdot n_3$, which is the quotient of the period $1/f_1 = 1/n_1 \cdot n_2 = 1/n_1$ (as $n_2 = 1$) of the vibration force imparted to the rotor vanes divided by ten, which is the number of rotary vanes. After the period $1/f_1$, a positive pulse is again transmitted from base clipper VI1. This pulse is then sent to the piezo-electric elements VIII, in sequence and with the phase lag $1/n_1 \cdot n_3$, through amplifiers VII, each connected to one of the ten base clippers VI.

In the embodiment shown in FIG. 9, it is also possible to apply vibration forces to the rotor vanes under the same conditions as such vibration forces are imparted thereto during actual running of the rotor in a turbine or the like.

Those embodiments of the invention in which a single exciting source, such as a stator nozzle, is used, have been explained above. Where plural numbers of exciting sources are used, it is necessary to provide an arrangement such that the pulses are transmitted at timed intervals corresponding to $1/n_1 \cdot n_2 \cdot n_3$, which is the reciprocal of the product $n_1$ of the rated r.p.m., the number $n_2$ of the exciting sources, and the number $n_3$ of the projecting members or rotor vanes. Each pulse is applied to the projecting members at each "$n_3$" number of pulses, so that a vibration force of which the number of pulses is $n_1 \cdot n_2$, is applied to each projecting member or rotor vane. The application of vibration force is shifted sequentially to adjacent projecting members at a phase difference equal to $1/n_1 \cdot n_3$, and the pulse is distributed in succession at a lag of $n_2$ pulses.

What is claimed is:

1. A method of simulating accurately the vibration modes of a rotary body, such as a vaned turbine rotor, having radially projecting elements subjected, during rotation of the body, to vibration from at least one vibration exciting source, said method comprising the steps of, while maintaining the rotary body stationary, sequentially and successively applying, to each projecting element, a vibration force having a frequency of $n_1 \cdot n_2$ wherein $n_1$ is the rated r.p.m. of the rotary body and $n_2$ is the number of vibration exciting sources effective on a projecting element during each revolution; and shifting the application of the vibration force from one projecting element to the next succeeding projecting element at a phase difference of $1/n_1 \cdot n_3$ where $n_3$ is the number of projecting elements.

2. Apparatus for simulating accurately the vibrating modes of a rotary body, such as a vaned turbine rotor, having radially projecting elements subjected, during rotation of the body, to vibration from at least one vibration exciting source, said apparatus being operable to effect such determination while the rotary body is maintained stationary, and comprising, in combination, plural electrically activated vibration elements each secured to a respective projecting element; plural electronic components each connected to a respective vibration element and operable, when triggered, to activate the connected vibration element at a frequency of $n_1 \cdot n_2$ wherein $n_1$ is the rated r.p.m. of the rotary body and $n_2$ is the number of vibration exciting sources effective on a projecting element during each revolution; and means connected to said electronic components and operable to apply triggering pulses thereto sequentially and successively at a phase difference of $1/n_1 \cdot n_3$ where $n_3$ is the number of projecting elements.

3. Apparatus, as claimed in claim 2, in which said vibration elements comprise piezo-electric elements.

4. Apparatus, as claimed in claim 2, in which said electronic components include flip-flop circuits equal in number to the number of projecting elements, and each connected to a respective piezo-electric element; each flip-flop circuit including a set input terminal, a set output terminal, a reset input terminal, a trigger input terminal and a reset output terminal; the set output terminal and the reset output terminal of each flip-flop circuit being connected to the set input terminal and the reset input terminal, respectively, of the adjacent flip-flop circuit, with the set output terminal and the reset output terminal of the last flip-flop circuit being connected to the set input terminal and the reset input terminal, respectively, of the first flip-flop circuit, whereby said flip-flop circuits are interconnected in a ring formation; each piezo-electric element being connected to the set output terminal of a respective flip-flop circuit; said last-named means applying an input pulse to a direct set input terminal included in the first flip-flop circuit.

5. Apparatus, as claimed in claim 4, in which each of said flip-flop circuits includes a direct reset input terminal; means operable to apply a DC potential to the direct reset input terminals of all of said flip-flop circuits; and a pulse transmitter terminal connected to the trigger input terminals of all of said flip-flop circuits.

6. Apparatus, as claimed in claim 2, in which said last-named means comprises a transmitter having a sine wave output whose frequency is twice the frequency of vibration of said vibration elements, a wave form shaper connected to the output of said transmitter and converting the sine wave into a symmetrical square wave form whose frequency is equal to the frequency of said vibrations elements, and an integrator connected to the output of said wave form shaper and converting the symmetrical square wave into a symmetrical triangular wave form; said electronic components comprising voltage comparators connected in parallel to the output of said integrator and equal in number to half the number of the projecting elements, a respective differential circuit connected to the output of each voltage comparator, two base clippers connected to the output of each respective differential circuit to separate the positive and negative pulses of the associated differential circuit, and amplifier means connecting each respective pair of base clippers to a respective vibration element.

7. Apparatus, as claimed in claim 6, in which said vibration elements comprise piezo-electric elements.

References Cited
UNITED STATES PATENTS

| | | | |
|---|---|---|---|
| 1,502,903 | 7/1924 | Campbell | 73—67.2X |
| 3,289,073 | 11/1966 | Loeffler | 73—67UX |
| 3,292,425 | 12/1966 | Conn | 73—67.2X |

RICHARD C. QUEISSER, Primary Examiner

C. E. SNEE III, Assistant Examiner